UNITED STATES PATENT OFFICE.

DAVID J. GILES, OF McKEESPORT, PENNSYLVANIA.

PROCESS OF REDUCING TUNGSTEN ORES.

1,348,356. Specification of Letters Patent. Patented Aug. 3, 1920.

No Drawing. Application filed May 3, 1919. Serial No. 294,549.

*To all whom it may concern:*

Be it known that I, DAVID JOHN GILES, a resident of McKeesport, in the county of Allegheny and State of Pennsylvania, have invented a new and useful Improvement in Processes of Reducing Tungsten Ores, of which the following is a specification.

The invention relates to a process of producing usable compounds of tungsten from various ores.

The object of the invention is to provide a process for economically producing substantially pure tungsten from impure ores, especially those which contain tin, lead, zinc, manganese, iron, sulfur and the like in such quantities that such ores have not been practical to use with the processes heretofore practised.

Tungsten ores which contain more than a very small percentage of the other metals (except iron) above named have heretofore not been practical to utilize, due to the fact that the impurity metals, and particularly tin and the like become alloyed or amalgamated with the tungsten and render the latter unfit for practical use. By the improved process such impure ores are treated in a way to prevent the tin and other impurity metals (except iron) from alloying with the tungsten so that they can be separated out and leave a substantially pure tungsten product.

The preferred way of carrying out the process consists in grinding the ore to rather a fine condition, although the degree of fineness may be varied to a considerable extent. It has been found that grinding to a fineness from 20 to 100 mesh gives satisfactory results. If the ground ore contains sulfur, it is first subjected to an oxidizing roast which may be done in an ordinary open reverberatory furnace, or in any other form of furnace or oven used for roasting ores, and by means of which all of the sulfur is driven off. The roasted ore is then mixed with carbon, or a carbon compound, such as coal, graphite, or charcoal, either in a crushed or pulverized condition or in lump form, and in sufficient quantities to reduce all of the metallic oxids in the ore. This mixture is then subjected to heat in a manner to exclude the direct contact of the flame with the mixture, such as in closed pots set in a reverberatory or like furnace, or in the well known tube furnace where the heat is applied externally to the pots or tubes; and at a temperature not to fuse or clinker the mass, the temperature and time of treatment being so regulated as to bring about a complete reduction of the oxids of tungsten and other metals in the ore, and produce an unsintered mass consisting almost entirely of metallic tungsten and the other metals, with a certain amount of silica. Since no fusion takes place in the heat treatment there is no alloying or amalgamation of the impurity metals with the tungsten. The mass is then ground fine, preferably to about 100 mesh, and is treated with a suitable acid, such as hydrochloric, sulfuric, etc, which in the case of hydrochloric may be concentrated but preferably is diluted, said treatment being preferably carried on by heating, and whereby all the tin, lead, zinc, and manganese are dissolved and converted into chlorids (or sulfates if sulfuric acid is used) leaving a solid residue consisting almost entirely of silica and a metallic tungsten with iron alloyed therewith. Some of the iron is also removed by the hydrochloric acid, but most of it is found alloyed with the tungsten. The solution, consisting of chlorids (or sulfates) of tin and the other impurity metals, is then separated from the undissolved tungsten by decantation or filtration, and the metals are recovered from said solution as by-products which have considerable value.

If desired, a little hydro-fluoric acid may be added with the other acid, to remove a portion of the silica. This however is generally unnecessary because the silica content of these ores is generally low, and in any event the tungsten is used primarily for forming alloys of iron, steel and the like, so that any silica which is mixed with the tungsten merely comes out in the slag and therefore is not detrimental. The iron alloyed with the metal obviously does not detrimentally affect the use of the tungsten as an alloying ingredient for iron and steel.

It is possible by this process to produce substantially pure usable tungsten compounds from tungsten ores which are so high in tin and other impurity metals that they have not been practically usable with the processes heretofore in vogue for reducing tungsten ores.

Among the tungsten ores to which the process is applicable, are ferberite, that is, iron tungstate; wolframite, that is a mixture of manganese tungstate and iron tungstate;

hubernite, that is, manganese tungstate; and sheelite, that is, calcium tungstate.

Since in the process the ore is never heated to the point of fusion of the metals, the impurity metals (except iron) never alloy with the tungsten, and therefore can be separated out by the acid treatment. Consequently, it is possible to successfully treat ores which run righ in the impurity metals. Since the heat employed is relatively low, and since the impurity metals can be recovered as by-products, the process is very economical. Furthermore, on account of the low temperature practically none of the tungsten is volatilized or sublimated, so that the process results in the recovery of practically all of the tungsten.

If the ore contains no sulfur the roasting step can of course be omitted.

I claim:

1. The process of producing tungsten from impure ores of the character specified, which consists in treating the ground ore with carbon at a temperature below the fusing point of the mass to reduce the metal constituents of the ore, and afterward separating out the impurity metals.

2. The process of producing tungsten from impure ores of the character described, which consists in treating the ground ore with carbon at a temperature below the fusing point of the mass to reduce the metal constituents of the ore, and then treating the mass with an acid to dissolve out the impurity metals.

3. The process of producing tungsten from impure ores of the character described, which consists of first roasting the ground ore, then treating the same with carbon at a temperature below the fusing point of the mass to thereby reduce all the metal constituents, and then separating out the impurity metals.

4. The process of producing tungsten from impure ores of the character described, which consists in first roasting the ore, then grinding and treating with carbon at a temperature below the fusing point of the mass to thereby reduce all of the metal constituents, and then treating the mass with an acid to dissolve out the impurity metals.

5. The process of producing tungsten from impure ores of the character described, which consists in treating the ground ore with carbon at a temperature below the fusing point of the mass to thereby reduce the metal constituents, treating the reduced mass with acid to dissolve out the impurity metals, separating the solution from the solid tungsten compound, and treating said solution to recover the impurity metals therefrom.

In testimony whereof I have hereunto set my hand.

DAVID J. GILES.

Witness:
 ALICE A. TRILL.